United States Patent [19]

Taylor et al.

[11] Patent Number: 4,708,548
[45] Date of Patent: Nov. 24, 1987

[54] RELEASABLE COUPLING

[76] Inventors: Peter Taylor, 55, Rees Drive, Finham, Coventry, West Midlands; Roger B. Griffin, 258 Birmingham Road, Allesley Village, Coventry, West Midlands, both of United Kingdom

[21] Appl. No.: 808,387

[22] Filed: Dec. 16, 1985

Related U.S. Application Data

[63] Continuation of Ser. No. 561,457, Dec. 14, 1983, abandoned.

[30] Foreign Application Priority Data

Dec. 15, 1982 [GB] United Kingdom ............... 82-35739
Apr. 16, 1983 [GB] United Kingdom ............... 83-10351

[51] Int. Cl.$^4$ .................... B23B 31/06; B23B 31/10
[52] U.S. Cl. .................... 409/234; 279/1 B; 279/1 E; 279/81
[58] Field of Search .................... 409/232, 234; 408/239 R; 279/1 B, 1 E, 75, 76, 77, 78, 79, 80, 81

[56] References Cited

U.S. PATENT DOCUMENTS

| | | | |
|---|---|---|---|
| 1,862,859 | 6/1932 | Michel | 279/79 X |
| 3,405,950 | 10/1968 | Cox | 409/232 X |
| 3,708,178 | 1/1973 | Lauricella | 279/81 |
| 3,747,946 | 7/1973 | Edens | 279/81 |
| 3,970,323 | 7/1976 | Schnizler, Jr. | 279/81 X |
| 4,298,208 | 11/1981 | Benjamin et al. | 409/234 X |

Primary Examiner—Gil Weidenfeld
Assistant Examiner—Glenn L. Webb
Attorney, Agent, or Firm—Watson, Cole, Grindle & Watson

[57] ABSTRACT

A releasable coupling especially for quick inter-changeable tool mounting purposes comprises a socket member, e.g. for mounting in a machine tool drive spindle and a spigot shown of taper form and received by a corresponding socket in the socket member. The socket member has a driving engagement with the spigot and a shank of the latter may consist of or carry any one of a variety of tooling. A collar movable between locking and release positions about the socket member has internal cam formation acting on retaining elements such as balls in bores through the socket member which balls engage an annular groove about the spigot to retain it in the socket. Release movement of the collar enables the balls to radially retract for withdrawal of the spigot. The collar is spring loaded towards the locking position and a spring loaded ball carried by the collar is arranged to engage a flange of the socket member to hold the collar in the release position which ball is disengaged by a flange of the spigot on full insertion of the latter into the socket in order to obtain automatic spring loaded turning of the collar to the locking position. The collar is retained in the locking position by spring loaded pawl and ratchet mechanism releasably by an externally operable plunger, i.e. when it is required to turn the collar to the release position.

3 Claims, 4 Drawing Figures

RELEASABLE COUPLING

This application is a continuation of application Ser. No. 561,457 filed Dec. 14, 1983 now abandoned.

BACKGROUND OF THE INVENTION

The object of this invention is to provide a coupling which can be quickly released or engaged, primarily for the purpose of interchangeable mounting of rotary tooling, e.g., in the drive spindle of a machine tool, and whereby accurate and positive mounting is obtainable as regards axial and co-axial location of the tooling or for other purposes. Practical advantages in these and other respects will be apparent from the following description.

SUMMARY OF THE INVENTION

According to this invention a releasable coupling especially for tool mounting purposes comprises a socket member; a male member or spigot receivable by the socket of the socket member; retaining element or ball means within the socket for engagement with co-operating formation of the male member or spigot; and an outer member or collar movable about the socket member and on operation arranged to act therethrough on the retaining element or ball means for either thrusting the latter into retentive engagement with the male member or spigot for retention thereof in the socket or conversely for obtaining release of said engagement and permitting withdrawal of the male member or spigot from the socket.

BRIEF DESCRIPTION OF THE DRAWINGS

In a practical example of the invention as a quick release coupling for tool mounting purposes the construction and arrangement is as shown in the accompanying drawings in which.

Figure 1:
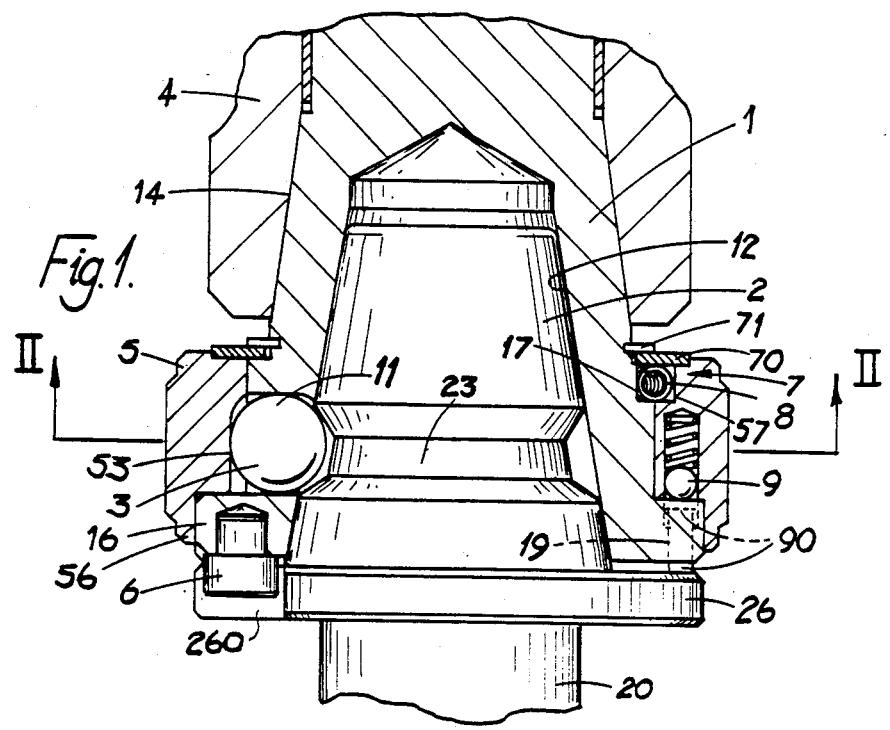
FIG. 1 is an axial plan section of the coupling members fully engaged with one another, the section being taken on the line I—I of FIG. 2.

DESCRIPTION OF PRACTICAL EMBODIMENTS.

The socket member 1 of the coupling is shown received by the bore of a drive spindle 4 of a machine tool such as a numerically controlled (N.C. or C.N.C.) machine and is also shown having an external Bridgeport taper form 14 for this purpose, but may be otherwise suitably formed.

The socket 12 of the member 1 is of taper form for receiving a male member or spigot 2 of corresponding non-locking taper form, and a forward part of the socket member 1 is provided with radial bores 13 through its wall, each receiving a retaining element shown in the form of a ball 3, the balls 3 releasably engaging an annular groove 23 in the spigot 2.

Provided about that forward part of the socket member 1 which protrudes beyond the end of the spindle 4 is a ring or collar 5 internally formed with inclined cam surfaces 53 which each co-operate with a corresponding ball 3 for either thrusting the balls 3 in a radial inward direction into engagement with the groove 23 of the spigot 2 or for permitting their retraction therefrom according to the direction of turning movement of the collar 5 about the socket member 1.

Figure 2:
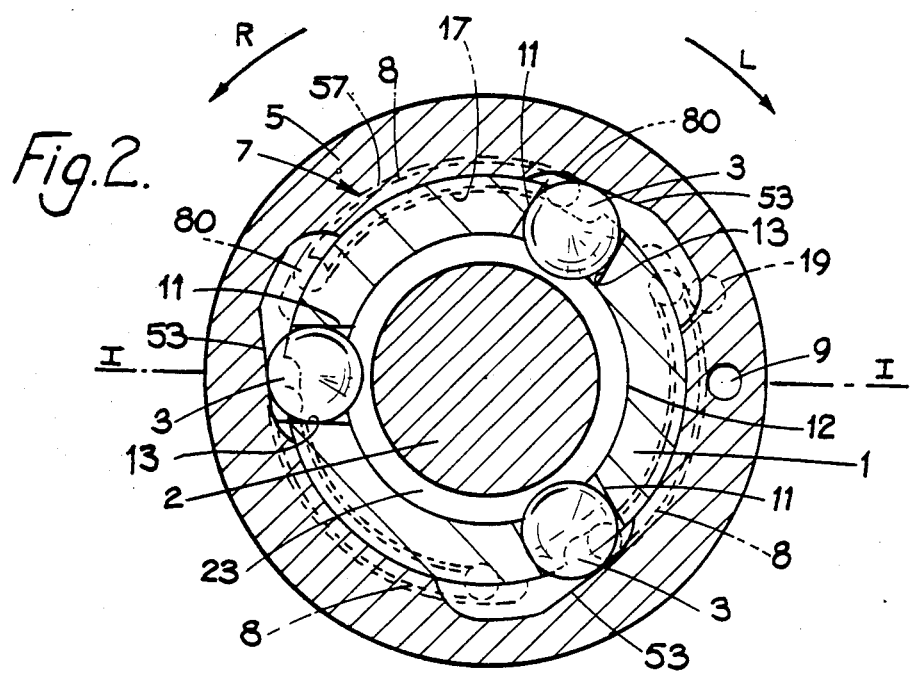
FIG. 2 is a cross section taken on the line II—II of FIG. 1.
Figure 3:
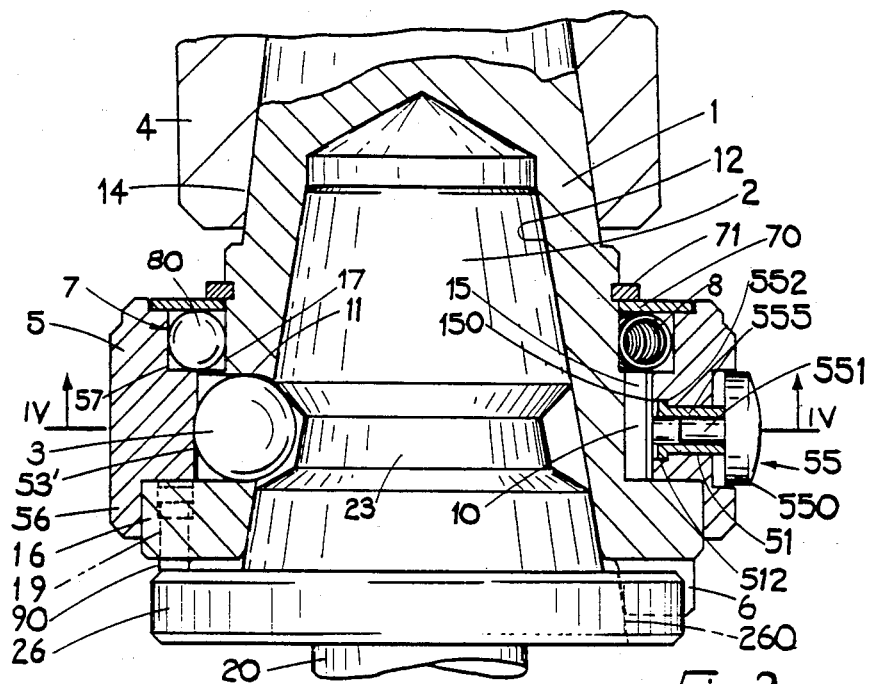
FIG. 3 is an axial plan section of the fully engaged coupling members showing a development, the section being taken on the line III—III of FIG. 4

Thus the spigot 2 can be quickly inserted into the socket 12 and retained therein by turning movement of the collar 5 in a clockwise direction L as seen, for example, in FIG. 2, or just as quickly withdrawn from the socket 12 by turning the collar 5 in the opposite direction R. In either case, only a short angular extent of turning movement of the collar 5 is required and the exterior of the collar 5 is formed whereby it can be readily turned by hand.

For balanced three point retentive engagement with the spigot 2, three equi-spaced balls 3 are shown employed, but the number of balls may be varied according to requirements, i.e., depending on the size of the coupling and the load which it is required to withstand in use.

For obtaining a positive rotary drive between the socket member 1 and spigot 2, dogged or similar driving engagement of any suitable kind is provided and is shown consisting of studs 6 (one of which is visible in FIG. 1) extending from a forward flange 16 of the socket member 1 and engaged by corresponding radial recesses 260 or bores in a flange 26 about the spigot 2.

A pair of diametrically opposite studs 6 and recesses 260 may be provided in this way or the number may be varied again according to the size and intended load capacity of the coupling and preferably in an equispaced manner. As the spigot 2 is inserted in the socket 12, the recesses 260 are aligned with the studs 6 to provide the driving engagement.

Such driving engagement can be accurately and positively obtained whilst the engagement of the balls 3 with the groove 23 retains the spigot 2 firmly seated in the socket 12 for accurate axial location of the socket member 1 and spigot 2, which is usually further maintained by axial loading under operating conditions.

In order to releasably maintain the collar 5 in the locking position, it is preferably spring urged in the appropriate turning direction, and this is shown achieved by means of compression springs 8, each accommodated in a curved channel 7 formed by complementary grooves 17, 57 about the exterior of the socket member 1 and at the inner periphery of the collar 5 in a symmetrical manner, the curved channels 7 so formed being concentrically arranged about the axis of the coupling.

Each spring 8 abuts at one end the corresponding end of the groove 17 in the socket member 1 and at the other end the corresponding end of the groove 57 in the collar 5. In the refinement shown for obtaining satisfactory abutment, a ball 80 is provided at each end of the spring 8. As will be appreciated, the grooves 57 of the collar 5 move angularly relative to those 17 in the socket member 1 when the collar 5 is turned and some angular end overlap is provided to ensure that necessary radially inward operation of the balls 3 can take place when the collar 5 is fully in the locking position.

For assembly purposes the channels 7 provided by the grooves are closed by an annular cover member shown in the form of a flat ring 70 which is retained in position by a circlip 71 received by the socket member 1. In conjunction with the flange 16 the circlip 71 and ring 70 serve to axially retain the rotatable collar 5 about the socket member 1. The collar 5 is also shown extending axially about the flange 16 at 56 to prevent or minimise the entry of dirt or swarf into the mechanism of the coupling.

To facilitate withdrawal of the spigot 2 from the socket 12, and more particularly its insertion therein, the collar 5 has an automatically releasable self retaining action when it is turned to the spigot release position to permit retraction of the balls 3 from the annular groove 23. Such releasable retention of the collar 5 against return movement is shown achieved by a spring-loaded member or ball 9 carried by the collar 5 and which snaps into a recess or bore 19 in the opposed face of the flange 16 at the leading end of the socket member 1. The action of the ball 9 also limits necessary angular release movement of the collar 5.

Thus, by such retention it is unnecessary to manually hold the collar 5 against its angular spring loading by the springs 8 while the spigot 2 is inserted in the socket 12, and in order to obtain automatic release of such retention, a plunger 90 in the bore 19 in the flange 16 is depressed by the flange 26 of the spigot 2 to push the ball 9 out of engagement with the bore 19. More specifically, the flange 26 contacts an end portion of the plunger 90 which extends forwardly of the flange 16. This enables the collar 5 to be turned to the locking position by the springs 8 for thrusting the balls 3 into engagement with the groove 23 of the spigot 2.

As will be appreciated, the socket 12 can be kept ready in this way to receive a spigot 2, but as soon as the spigot 2 is pushed fully home into the socket 12, retention of the collar 5 is released, for in turn obtaining retention of the spigot 2 in the socket 12 by the action of the balls 3.

In a further refinement (not shown) for ensuring balanced spring pressure between the collar 5 and the flange 16, two further spring-loaded elements or balls are provided in an equi-spaced manner to the shown locking ball 9, but which simply bear on the opposed face of the flange 16, since the locking action of the one ball 9 is sufficient for retaining the collar 5 in the release position.

The shank portion 20 of the spigot 2 may carry or consist of any one of a wide variety of tooling such as, for example, a drill or a milling cutter or a tool holder or chuck for use in a quickly interchangeable manner, especially in the case of preset tools to suit computer controlled operation of the machine. Furthermore, the arrangement does not place any limitation on the form or diameter of the shank portion 20 immediately adjacent the flange 26 and which may extend radially beyond the latter.

In a development of the coupling, means are provided to positively but releasably prevent release operation of the coupling during use, in particular release turning movement of the collar 5, i.e., in the direction of the arrow R and which otherwise might arise under certain conditions of use involving, for example, exceptional vibration or other factors, such as particular loading on the coupling and/or inertia forces.

For this purpose releasable ratchet locking mechanism is provided and is shown consisting firstly of a blade spring 15 riveted or otherwise secured at one end at 151 to the exterior of the socket member 1 and accommodated in an external side recess 10 bounded by the collar 5, i.e., in the general plane of the balls 3. The other or free end 150 of the blade spring 15 acts as a pawl in engaging ratchet teeth 50 locally formed at an appropriate location on the inner periphery of the collar 5.

As the collar 5 is turned in the locking direction L to thrust the balls 3 into retentive engagement with the groove 23 of the spigot 2, the free end 150 of the blade spring 15 rides over one or more of the teeth 50 into abutment with one of them for positively preventing return or release rotation R of the collar 5.

However, when it is required to effect release turning movement of the collar 5, provision is included for disengaging or lifting the end 150 of the blade spring 15 from the ratchet teeth 50. This is shown consisting of a plunger 55 operating in a radial bore 51 in the collar 5 which bore 51 breaks through the inner wall of the collar 5 at the location of the ratchet teeth 50.

As the exterior of the collar 5 is grasped by the hand for release turning operation, the head 550 of the plunger 55 is depressed to lift the blade spring end 150 from the ratchet teeth 50 and so permit releasing turning of the collar 5. (Note the ratchet teeth 50 are on the inner periphery of the collar 5, i.e., they are not on the inner end of the plunger 55).

For assembly purposes the plunger 55 is of two part construction in which a shank 551 of the head 550 is positively secured in the plunger body 555, the latter having a flange 552 at its inner end engaging a counter bore 512 of the bore 51 for captive retention of the plunger 55 in the collar 5 for necessary radial movement. The blade spring 15 also serves to thrust the plunger 55 outwardly so that its head 550 projects from the exterior of the collar 5 for thumb pressure operation.

A modified form of cam surface 53' is shown together with a part spherical or curved recess 530 for accommodating the corresponding ball 3 in the release position.

Figure 4:
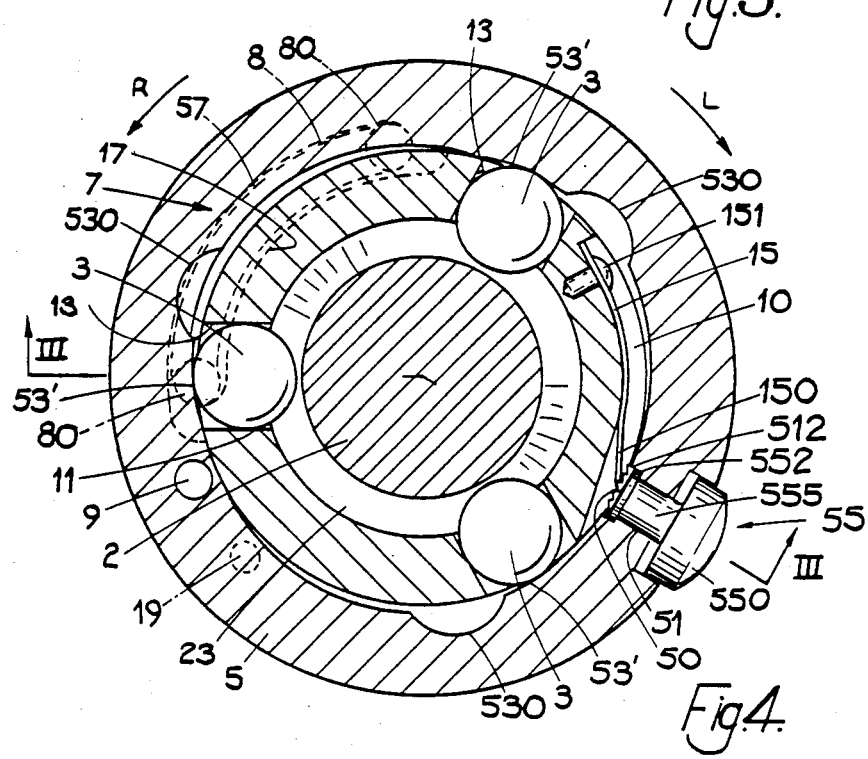
FIG. 4 is a cross-section taken on the line IV—IV of FIG. 3.

Only one of three compression springs 8 and associated end balls 80 are indicated in FIG. 4 in the interests of clarity.

The quick release action and rapid mounting obtained by means of the coupling represents a considerable saving in tool changing time compared with the known procedure of retaining a male member or spigot in a socket member by a ring nut, which latter requires to be firmly tightened for retention of the members and unscrewed for their release.

We claim:

1. A releasable coupling especially for tool mounting purposes which comprises
    (a) a socket member having a forward end, an axial socket therein and radial bore formation therethrough communicating with said axial socket, said socket member having an outwardly directed radial flange thereabout at its forward end, which flange is externally formed for direct positive dogged rotary driving engagement with a cooperating outwardly directed flange of a male member;
    (b) a male member axially receivable by said axial socket of the socket member so as to have a non-locking fit therein, said male member having an outwardly directly radial flange thereabout which is externally formed for direct positive dogged rotary driving engagement with said outwardly directed radial flange of said socket member when the male member is fully inserted in said axial socket of said socket member, which driving engagement is disengaged on withdrawal of the male member;

(c) retaining element means radially movable within the radial bore formation of the socket member for engagement with cooperating recessed formation in the male member;

(d) a collar rotatable about the socket member but constrained against axial movement on said socket member between retaining means thereon and the rear of said outwardly directed radial flange on said socket member, said collar having internal cam formation arranged, on appropriate turning movement of the collar relative to the socket member, to act on the retaining element means for either thrusting the latter into retentive engagement with the cooperating recessed formation of the male member for axial retention thereof in the socket of the socket member or, conversely, for permitting release of said engagement and enabling axial withdrawal of the male member from the socket;

(e) spring-loaded means acting between the socket member and collar for urging the latter for rotation in a direction to thrust the retaining element means into retentive engagement with the male member; and (f) spring-loaded retaining means acting between the collar and the socket member for releasably retaining the spring-loaded collar in a release position relative to the socket member so as to permit outward radial movement of the retaining element means from the cooperating formation of the male member and axial withdrawal of the latter from the socket, said spring-loaded retaining means comprising a spring-loaded member carried by the collar in an axially parallel manner and directly engageable with a cooperating axially parallel bore through the outwardly directed radial flange about the socket member for retaining the collar in the release position, said bore containing a plunger which protrudes forwardly from said flange for contact and axial movement by the outwardly directed radial flange of the male member on full axial insertion of the latter into the socket of the socket member in order to lift the spring-loaded member from engagement with the bore and thus permit spring-loaded rotation of the collar about the socket member from the release position for obtaining automatic axial retention of the male member therein.

2. A releasable coupling according to claim 1, wherein releasable retaining means is provided acting between the socket member and the collar for releasably retaining the latter and the socket member in a relative angular position whereby the retaining element means is maintained in relentive engagement with the male member, wherein the releasable retaining means comprises a spring-loaded pawl carried by an outer peripheral part of the socket member and arranged to engage a ratchet tooth formation on an inner peripheral part of the collar, and a plunger carried by the latter and extending radially therethrough for exterior press operation in order to lift the pawl from engagement from the ratchet tooth formation when release of the retaining means is required for turning movement of the collar to permit release retraction of the retaining element means.

3. A releasable coupling according to claim 2, wherein the spring-loaded pawl consists of a blade spring secured to the outer peripheral part of the socket member, a free end of the blade spring acting as a pawl for engaging the ratchet tooth formation on the inner peripheral part of the collar.

* * * * *